US008396113B2

(12) United States Patent
Choi et al.

(10) Patent No.: US 8,396,113 B2
(45) Date of Patent: Mar. 12, 2013

(54) DATA RECEIVING DEVICE AND METHOD FOR SHORTENING CHANNEL SWITCHING TIME IN DIGITAL MULTIMEDIA BROADCASTING SYSTEM

(75) Inventors: Kwang-Pyo Choi, Anyang-si (KR); Chang-Sup Shim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1574 days.

(21) Appl. No.: 11/623,800

(22) Filed: Jan. 17, 2007

(65) Prior Publication Data
US 2007/0195892 A1    Aug. 23, 2007

(30) Foreign Application Priority Data
Feb. 17, 2006   (KR) .................. 10-2006-0015563

(51) Int. Cl.
*H04N 7/12*   (2006.01)

(52) U.S. Cl. ............. 375/240.01; 348/412.1; 348/415.1; 348/419.1; 348/526; 348/715

(58) Field of Classification Search ................... 375/240
See application file for complete search history.

(56) References Cited

U.S. PATENT DOCUMENTS

| 6,226,291 | B1 * | 5/2001 | Chauvel et al. ............... 370/392 |
| 6,393,054 | B1 * | 5/2002 | Altunbasak et al. .......... 375/240 |
| 6,985,188 | B1 * | 1/2006 | Hurst, Jr. ...................... 348/553 |
| 7,673,212 | B2 * | 3/2010 | Ji .................................. 714/752 |
| 2002/0154694 | A1 * | 10/2002 | Birch ....................... 375/240.05 |
| 2003/0039308 | A1 * | 2/2003 | Wu et al. .................. 375/240.12 |
| 2003/0137964 | A1 * | 7/2003 | Suenaga et al. ............... 370/342 |
| 2004/0034863 | A1 * | 2/2004 | Barrett et al. ..................... 725/38 |
| 2004/0066854 | A1 * | 4/2004 | Hannuksela ............. 375/240.27 |
| 2005/0083932 | A1 * | 4/2005 | Lee et al. ...................... 370/390 |
| 2005/0229221 | A1 * | 10/2005 | Kerofsky et al. .............. 725/100 |
| 2006/0021060 | A1 * | 1/2006 | Fujinami et al. ................ 726/26 |
| 2006/0161675 | A1 * | 7/2006 | Ducharme et al. ............ 709/231 |
| 2006/0200576 | A1 * | 9/2006 | Pickens et al. ................ 709/231 |
| 2006/0222323 | A1 * | 10/2006 | Sharpe et al. ................... 386/68 |
| 2006/0242240 | A1 * | 10/2006 | Parker et al. .................. 709/205 |

FOREIGN PATENT DOCUMENTS

| KR | 2005-93880 | 9/2005 |
| KR | 2006-26274 | 3/2006 |
| KR | 2006-53061 | 5/2006 |
| KR | 2006-72176 | 6/2006 |
| KR | 2006-91974 | 8/2006 |
| KR | 2006-135246 | 12/2006 |

* cited by examiner

OTHER PUBLICATIONS

Wang et al., MPEG-2 Video Decoder for DVD, Feb. 1998, Proceedings of the 8th Great Lakes Symposium on VLSI, pp. 157-160.*

*Primary Examiner* — Thanhnga B Truong
*Assistant Examiner* — Kenneth Chang
(74) *Attorney, Agent, or Firm* — Cha & Reiter, LLC

(57) ABSTRACT

Provided is a data receiving device and method for shortening a channel switching time in a DMB system. The device includes a CDM channel for receiving a broadcasting signal from a DMB satellite, demodulating the broadcast signal, and generating a MPEG2-TS packet. a GOP buffer for receiving the MPEG2-TS packet, checking whether or not the received MPEG2-TS packet is a key frame, and, when it is determined that the received MPEG2-TS packet is the key frame, initializing the buffer and storing the received MPEG2-TS packet as a GOP unit, a channel switch for switching a channel of a DMB service to the GOP buffer, an A/V reproducing buffer for buffering a predetermined amount of A/V data to reproduce the A/V data of the GOP buffer; and an A/V decoder for receiving and decoding the A/V data.

12 Claims, 6 Drawing Sheets

DATA RECEIVING DEVICE AND METHOD FOR SHORTENING CHANNEL SWITCHING TIME IN DIGITAL MULTIMEDIA BROADCASTING SYSTEM

CLAIM OF PRIORITY

This application claims the benefit of the earlier filing date, under 35 U.S.C. §119, to that patent application entitled "Data Receiving Device and Method for Shortening Channel Switching Time in Digital Multimedia Broadcasting System," filed in the Korean Intellectual Property Office on Feb. 17, 2006 and assigned Serial No. 2006-15563, the contents of which are incorporated herein by reference.

BACKGROUND OF THE INVENTION

1. Field of the Invention

The present invention relates generally to a digital multimedia broadcasting (DMB), and in particular, to a data receiving device and method for shortening a channel switching time in a DMB system.

2. Description of the Related Art

In general, digital broadcasting refers to a broadcasting service for providing a high definition, high fidelity, and high quality service to a user.

A satellite digital broadcasting, mainly aimed at a mobile service can allow a user to view a multi-channel broadcasting anytime and anywhere, using a mobile receiving device, e.g., a mobile phone, a personal digital assistant, and a vehicle receiving device.

A terrestrial digital broadcasting system, whose parent is digital audio broadcasting (DAB), is based on a concept of providing a mobile receiving multimedia broadcasting using a 12-numbered channel of a very high frequency (VHF) that is currently in idle. The terrestrial digital broadcasting transmits a television broadcast, a radio broadcast, and a data broadcast. Existing terrestrial service providers manage one analog channel, but digital broadcasting service providers are based on a concept of managing a plurality of digital channels. These services are called an ensemble.

In the terrestrial digital broadcasting, three ensembles can be transmitted over a VHF channel. It is possible to provide the service over about one video channel, two audio channels, and one data channel per ensemble.

Owing to the developments of a digital broadcasting technology and a mobile communication technology, attention is increasingly paid to a digital broadcasting service for allowing the user to view the digital broadcast even when the user is moving. In particular, attention is increasingly paid to a digital multimedia broadcasting (DMB) service using a mobile terminal.

Thus, the users can view a desired broadcasting anytime and anywhere, without being held to a fixed time, by storing the digital broadcast received using a DMB service in the mobile terminal.

However, the digital broadcast received using the DMB service has a drawback in that a channel switching time is remarkably longer compared with that of a general, analog, television broadcast.

FIG. 1 illustrates an example of a delay generated at the time of a channel switch in a satellite DMB service.

As shown in FIG. 1, five delays occur in a process of responding to a channel switching signal of the satellite DMB service from the user, switching a channel of the satellite DMB service, and outputting A/V data.

The five delays occurring at the time of the channel switch will be described in more detail. A deinterleaver buffering delay 101 refers to a time taken to empty and again fill a deinterleaver at the time of changing a code division multiplexing (CDM) channel in the satellite DMB service.

In general, the satellite DMB service is of a type in which broadcast programs are dispersed and transmitted to an N number of CDM channels. Each CDM channel is classified into a pilot channel, a program specific information (PSI) and system information (SI) channel, and a video and voice channel.

In the satellite DMB service, broadcast traffic is interleaved and transmitted on a very large unit. In other words, since traffic information encoded by an encoder is interleaved and transmitted on the very large unit, a receiving device cannot perform decoding until it receives all the interleaved traffic information. Further the receiver cannot perform the decoding until it completes the deinterleaving. Accordingly, in the satellite DMB service, the receiving device cannot decode broadcast service traffic until it receives data of a known amount interleaved before decoding the received traffic. Therefore, a significant delay is caused in providing the service.

A conditional access system (CAS) delay 102 refers to a time for waiting until necessary information is transmitted to provide a CAS service for checking whether or not a subscriber is authenticated.

p The deinterleaver buffering delay 101 and the CAS delay 102 are called a network delay 106.

A video key frame extraction delay 103 refers to a time for waiting until a key frame, for example, an instantaneous decoder refresh (IDR) frame in H.264, is reached to decode a compressed image data in a normal fashion.

Generally, in a compression method like H.264, there are three frame types;, intra-coded (I), predictive coded (P), and bi-directionally predictive coded (B) frames depending on a method for deciding a reference frame. The I frame refers to a frame for simply spatially converting only the frame without a motion compensation. The P frame refers to a frame for performing the motion compensation in a forward direction or in a reverse direction with reference to the I frame or the P frame and then, spatially converting a residual. The B frame refers to a frame for performing the motion compensation like the P frame but performing the motion compensation by the I and P frames, that is, in both directions on a time axis.

A frame encoding method, in which an inputted image can be restored to the original state independently of adjacent other images like the I frame, is called an original video encoding. An encoding method for estimating a current image by a previous image with reference to front/rear neighboring I frame or adjacent P frame is called a residual video encoding.

The key frame is a complete picture used for video compression. Referring to video group of pictures (GOP) structure, a frame is selected one by one at a constant interval from a temporal video flow, and is designated as the key frame. The key frame is an independently restorable video, and enables an arbitrary video access.

In MPEG, H.261, and H.264, the key frame is inserted at a constant interval into a GOP, and designates the I frame enabling independent video reproduction. However, without limitation to this, the frame independently restored to the original state without reference to other frames can be all defined as the key frame irrespective of a moving picture compression method.

An A/V reproducing buffer delay 104 refers to a delay time for buffering a predetermined amount of A/V data to stably reproduce the A/V data.

An A/V decoding delay 105 refers to a delay time for decoding and outputting the A/V data.

The video key frame extraction delay 103, the A/V reproducing buffer delay 104, and the A/V decoding delay 105 are called a codec delay 107.

In general, the deinterleaver buffering delay 101 generates a delay time of 2 seconds to 3 seconds. The video key frame extraction delay 103 generates a delay time of 0.5 seconds to 2 seconds. The A/V reproducing buffer delay 104 generates a delay time of about 1 second.

In the conventional DMB service, a technology for shortening a channel switching delay time mostly uses a method for providing several CDM channels and previously filling the deinterleaver of the adjacent channel.

This can minimize the deinterleaver buffering delay 101 at the time of the channel switching to the adjacent channel. Comparing with the deinterleaver buffering delay 101, the codec delay 107 is a long delay time. Therefore, a fast channel switching is impossible until the time for the codec delay 107 is shortened.

However, the above method can shorten a time for the deinterleaver buffering delay 101 of the network delay 106, but cannot shorten a time for the video key frame extraction delay 103 and the A/V reproducing buffer delay 104 of the codec delay 107.

SUMMARY OF THE INVENTION

The present invention provides a data receiving device and method for shortening a channel switching time of a digital multimedia broadcasting receiving device by minimizing a video key frame extraction delay of a codec delay during a delay time generated at the time of channel switching of a digital multimedia broadcast service.

In one embodiment, there is provided a data receiving device for shortening a channel switching time in a digital multimedia broadcast (DMB) system. The device includes a CDM (code division multiplexing) channel for receiving a broadcast signal from a DMB satellite, demodulating the broadcast signal, and generating a MPEG2-TS (moving picture experts group2-transport stream) packet; a GOP (group of picture) buffer for receiving the MPEG2-TS packet from the CDM channel, checking whether or not the received MPEG2-TS packet is a key frame, and, when it is determined that the received MPEG2-TS packet is the key frame, initializing a GOP buffer and storing the received MPEG2-TS packet as a GOP unit, a channel switch for switching a channel of a DMB service to the GOP buffer in response to an input signal from a user; an A/V (audio/video) reproducing buffer for buffering a predetermined amount of A/V data to reproduce the A/V data of the GOP buffer switched to by the channel switch; and an A/V decoder for receiving the A/V data from the A/V reproducing buffer, and decoding the received A/V data.

BRIEF DESCRIPTION OF THE DRAWINGS

The above features and advantages of the present invention will become more apparent from the following detailed description when taken in conjunction with the accompanying drawings in which.

DETAILED DESCRIPTION

Figure 1:
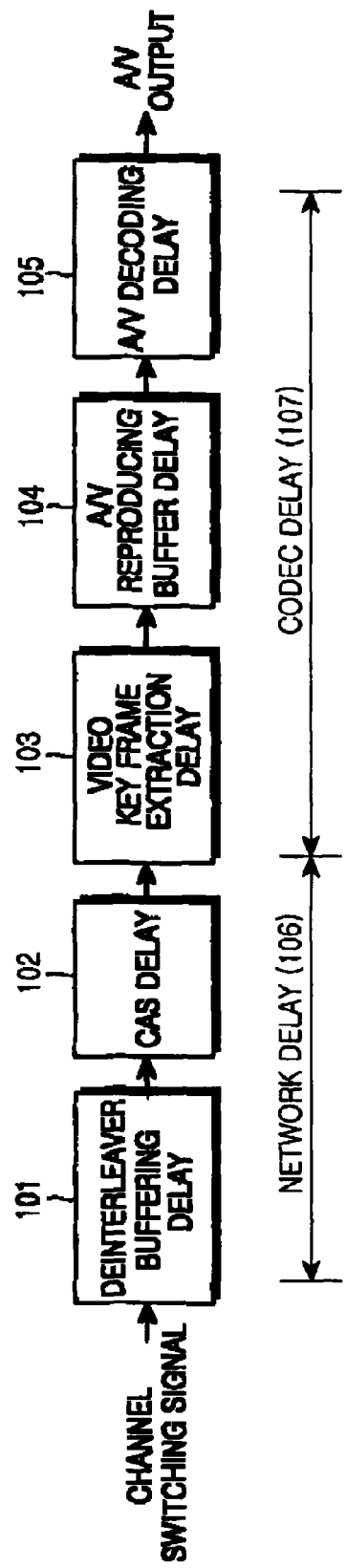
FIG. 1 illustrates an example of a delay generated at the time of channel switching of a DMB service.

An exemplary embodiment of the present invention will now be described in detail with reference to the annexed drawings. In the drawings, the same or similar elements are denoted by the same reference numerals even though they are depicted in different drawings. For the purposes of clarity and simplicity, a detailed description of known functions and configurations incorporated herein has been omitted for conciseness.

In the present invention, a digital multimedia broadcasting (DMB) system refers to a satellite DMB system. However, it will be obvious from a description of the present invention that the present invention is also applicable to a terrestrial DMB system.

Figure 2:
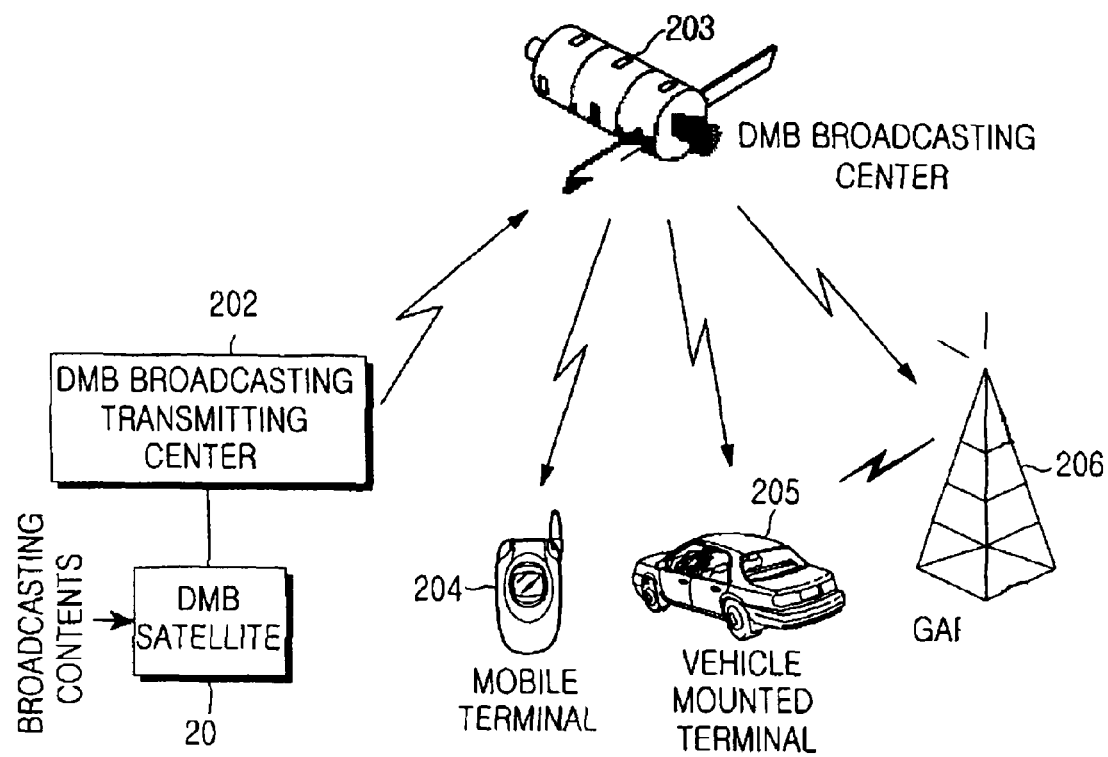
FIG. 2 illustrates a construction of a satellite DMB system according to an exemplary embodiment of the present invention.

FIG. 2 illustrates an exemplary construction of a satellite DMB system according to an embodiment of the present invention.

As shown in FIG. 2, the satellite DMB system includes a DMB broadcasting center 201, for converting broadcasting contents into a broadcasting signal (that is, code division multiplexing (CDM) and time division multiplexing (TDM) broadcasting signals) to provide the broadcasting contents to a user; a DMB broadcasting transmitting center 202, for receiving the broadcasting signal from the DMB broadcasting center 201, and transmitting the received broadcasting signal to a DMB satellite; the DMB satellite 203, for receiving the broadcasting signal from the DMB broadcasting transmitting center 202, and re-transmitting the received broadcasting signal, a DMB mobile terminal 204 and a vehicle mounted terminal 205 receiving the broadcasting signal from the DMB satellite 203 through a DMB receiving device (not shown); and a gap filler 206 for re-transmission to a shadow region.

In the DMB system according to the present invention, the DMB broadcasting transmitting center 202 transmits the broadcasting signal to the DMB satellite 203 using a Ku-band frequency, for example, 13 GHz, and the DMB satellite 203 transmits a circular polarization type CDM signal to the DMB mobile terminal 204 and the vehicle mounted terminal 205, each equipped with the satellite DMB receiving device, using an S-band frequency, e.g., 2.6 GHz.

The DMB satellite 203 transmits a linear polarization type TDM signal to the gap filler 206 using the Ku-band frequency, e.g., 12 GHz. The gap filler 206 converts the linear polarization type TDM signal into the circular polarization type CDM signal, and transmits the converted signal to the DMB mobile terminal 204 and the vehicle mounted terminal 205 each equipped with the satellite DMB receiving device using the S-band frequency (i.e., 2.6 GHz). The gap filler 206 is used for transmitting a satellite signal to the shadow region that the satellite signal cannot directly reach.

The DMB mobile terminal 204 and the vehicle mounted terminal 205 include the DMB receiving device (not shown), respectively, and receive the broadcast signal from the DMB satellite 203.

In the present invention, the DMB receiving device provided with the DMB mobile terminal 204 and the vehicle mounted terminal 205 includes an N number of code division multiplexing (CDM) channels for receiving several broadcast programs from the DMB satellite 203 for fast channel switching. Each of the CDM channels demodulates the CDM signal received from the DMB satellite 203, generates a pilot payload or a Moving Picture Experts Group2-Transport Stream (MPEG2-TS) packet depending on each channel characteristic, and transmits the generated pilot payload and MPEG2-TS packet to the GOP buffer over a channel selected by the user.

Figure 3:
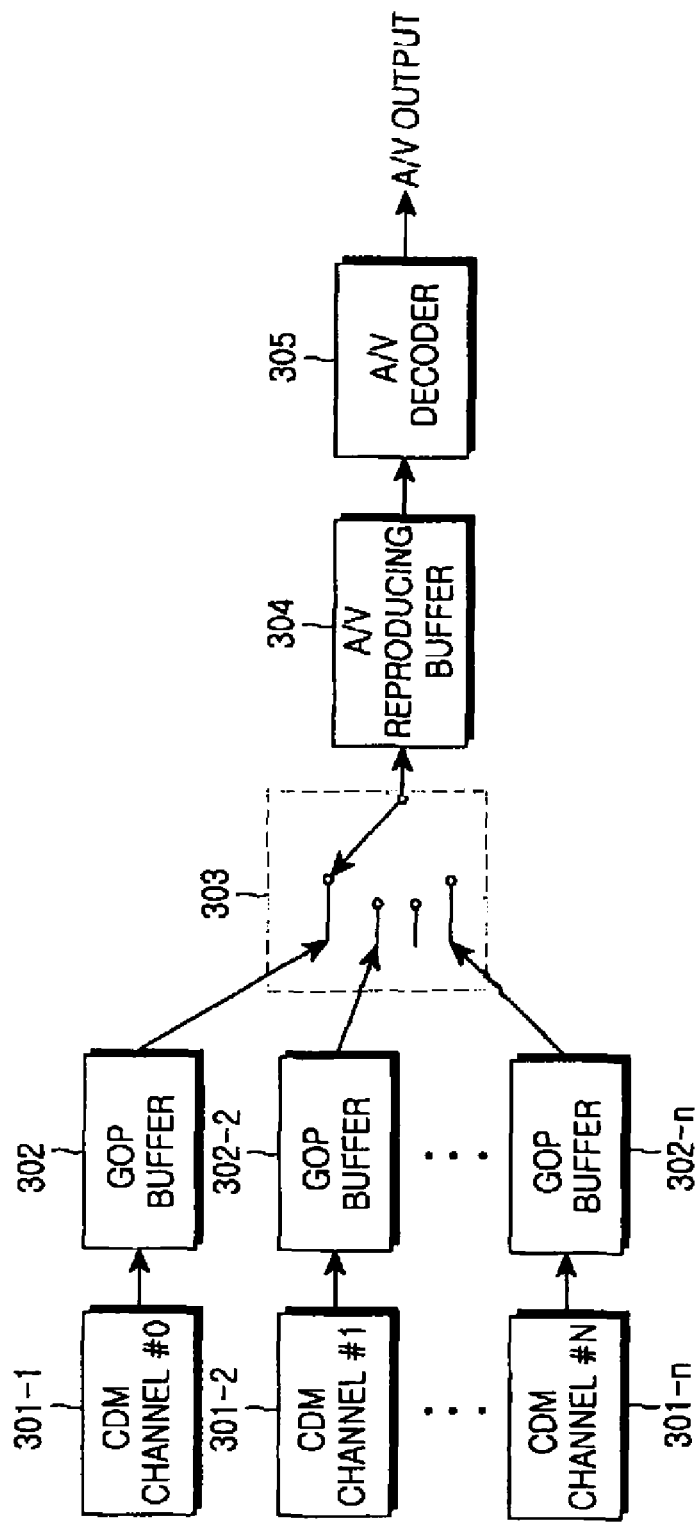
FIG. 3 illustrates a construction of a DMB receiving device according to an exemplary embodiment of the present invention.

FIG. 3 illustrates an exemplary construction of the DMB receiving device according to an embodiment of the present invention.

Referring to FIG. 3, the inventive DMB receiving device includes CDM channels 301-1 . . . 301-n for receiving the broadcast signal from the DMB satellite 203, demodulating the received broadcasting signal, generating the MPEG2-TS packet, and transmitting the generated MPEG2-TS packet to GOP buffers 302-1 . . . 302-n. The GOP buffers 302-1 . . . 302-n receive the MPEG2-TS packet from the CDM channels 301-1, . . . , 301-n, check whether or not the received MPEG2-TS packet is a key frame, and store the received MPEG2-TS packet as a GOP unit when it is determined that the received MPEG2-TS packet is the key frame. A channel switch 303 for switching the channel of the DMB service to the GOP buffers 302-1 . . . 302-n in response to an input signal from the user, an A/V reproducing buffer 304 for buffering a predetermined amount of A/V data to reproduce the A/V data of the GOP buffer switched by the channel switch 303; and an A/V decoder 305 for receiving the A/V data from the A/V reproducing buffer 304, and decoding the received A/V data.

A construction of the DMB receiving device is described in more detail. The CDM channel 301-1 . . . 301-n receives the broadcasting signal from the DMB satellite 203, demodulates the received broadcasting signal, generates the MPEG2-TS packet, and transmits the generated MPEG2-TS packet to the GOP buffer 302-1 . . . 302-n.

In the present invention, the DMB receiving device includes the N number of CDM channels 301-1 . . . 301-n for receiving several broadcasting programs from the DMB satellite 203 for the fast channel switching. Each of the CDM channels 301-1 . . . 301-n demodulates the CDM signal received from the DMB satellite 203, generates the pilot payload or the MPEG2-TS packet depending on each channel characteristic, and transmits the generated pilot payload and MPEG2-TS packet to the GOP buffer 302-1 . . . 302-n.

It will be obvious from the description of the present invention that the CDM channels 301-1 . . . 301-n provided for the DMB receiving device is larger in number than broadcast channels provided by the satellite DMB service.

The GOP buffer 302-1 . . . 302-n, each receive the MPEG2-TS packet from a corresponding CDM channel and checks whether or not the received MPEG2-TS packet is the key frame. When it is determined that the received MPEG2-TS packet is the key frame, the GOP buffer 302-1 . . . 302-n stores the received MPEG2-TS packet on the GOP unit. Here, GOP refers to a set of frames ranging from a specific key frame (or an IDR-frame) to a frame before a next key frame is inputted.

This process is now described in more detail. The GOP buffer 302-1 . . . 302-n checks the MPEG2-TS packet received from the CDM channel 301-1 . . . 301-n, respectively, and initializes a value of "t" denoting its buffering size by "0" when it is determined that the MPEG2-TS packet is equal to data corresponding to a start of a moving picture experts group2-packetized elementary stream (MPEG2-PES) and corresponds to the key frame. After that, the initialized GOP buffer 302-1 . . . 302-n stores the received MPEG2-TS packet until it again receives a key frame from the CDM channel 301-1 . . . 301-n. When it is determined that the inputted MPEG2-TS packet is the key frame, the GOP buffer 302-1 . . . 302-n repeats a process of initializing its buffering size by "0" and storing the MPEG2-TS packet until it receives a next key frame.

The GOP buffer 302-1 . . . 302-n always stores the MPEG2-TS packet corresponding to the received key frame at its start position.

A construction of the GOP buffer 302-1 . . . 302-n for storing the MPEG2-TS packet received from the CDM channel 301-1 . . . 301-n, on the GOP unit, will be described with reference to FIG. 4.

Figure 4:
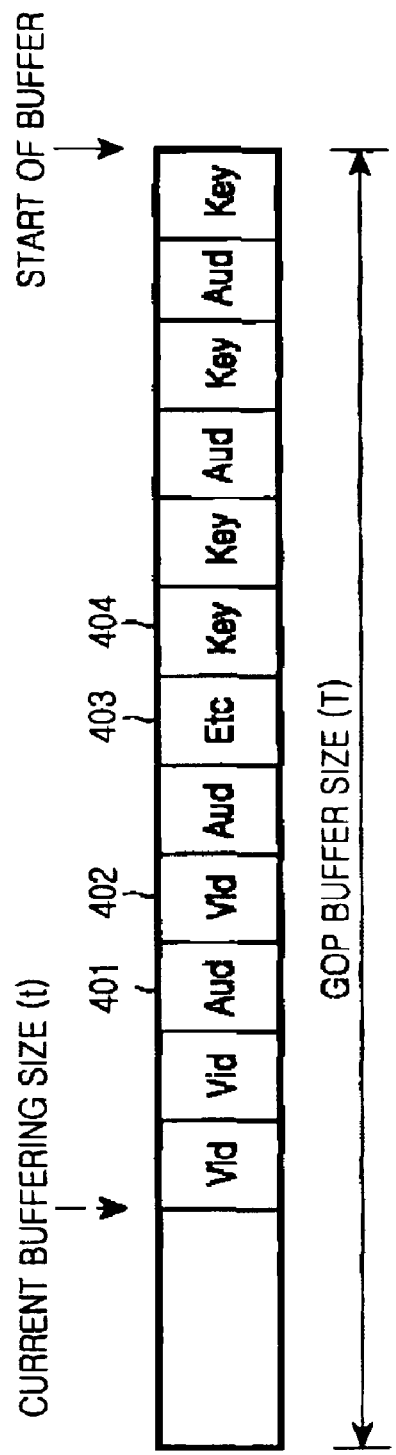
FIG. 4 illustrates a construction of a GOP buffer according to an exemplary embodiment of the present invention.

FIG. 4 illustrates a construction of the GOP buffer according to an exemplary embodiment of the present invention.

Referring to FIG. 4, the GOP buffer 302-1 . . . 302-n are expressed by a GOP buffer size (T) and a current buffering size (t). The MPEG2-TS packet stored in the GOP buffer 302-1 . . . 302-n is comprised of at least one Aud 401 portion that represents a MPEG2-TS packet corresponding to an audio, at least one Vid 402 portion that represents a MPEG2-TS packet corresponding to a video, not the key frame, an Etc 403 that represents other MPEG2-TS packets, not associate with the audio and the video; and a key 404 that represents a MPEG2-TS packet corresponding to the video key frame (or the IDR-frame).

The GOP buffer 302-1 . . . 302-n always stores the MPEG2-TS packet corresponding to the video key frame at its start position, and sequentially stores MPEG2-TS packets not corresponding to a subsequently received key frame, which are video P-frames, or MPEG2-TS packets corresponding to audio data.

A size of the GOP buffer 302-1 . . . 302-n should be greater than or equal to an amount of data of the MPEG2-TS packet transmitted during a GOP time.

The MPEG2-TS packet is typically buffered for about one second to store a GOP unit. This represents an amount of data of about 64 Kbytes in the satellite DMB. Accordingly, in the satellite DMB, the GOP buffer is provided 64 Kbytes or more.

In case where the receiving device simultaneously deinterleaves the N number of channels including all of a primary channel that is in the course of providing the satellite DMB service and a sub channel that is an auxiliary channel, it has a memory of about N×64 Kbytes.

Figure 5:
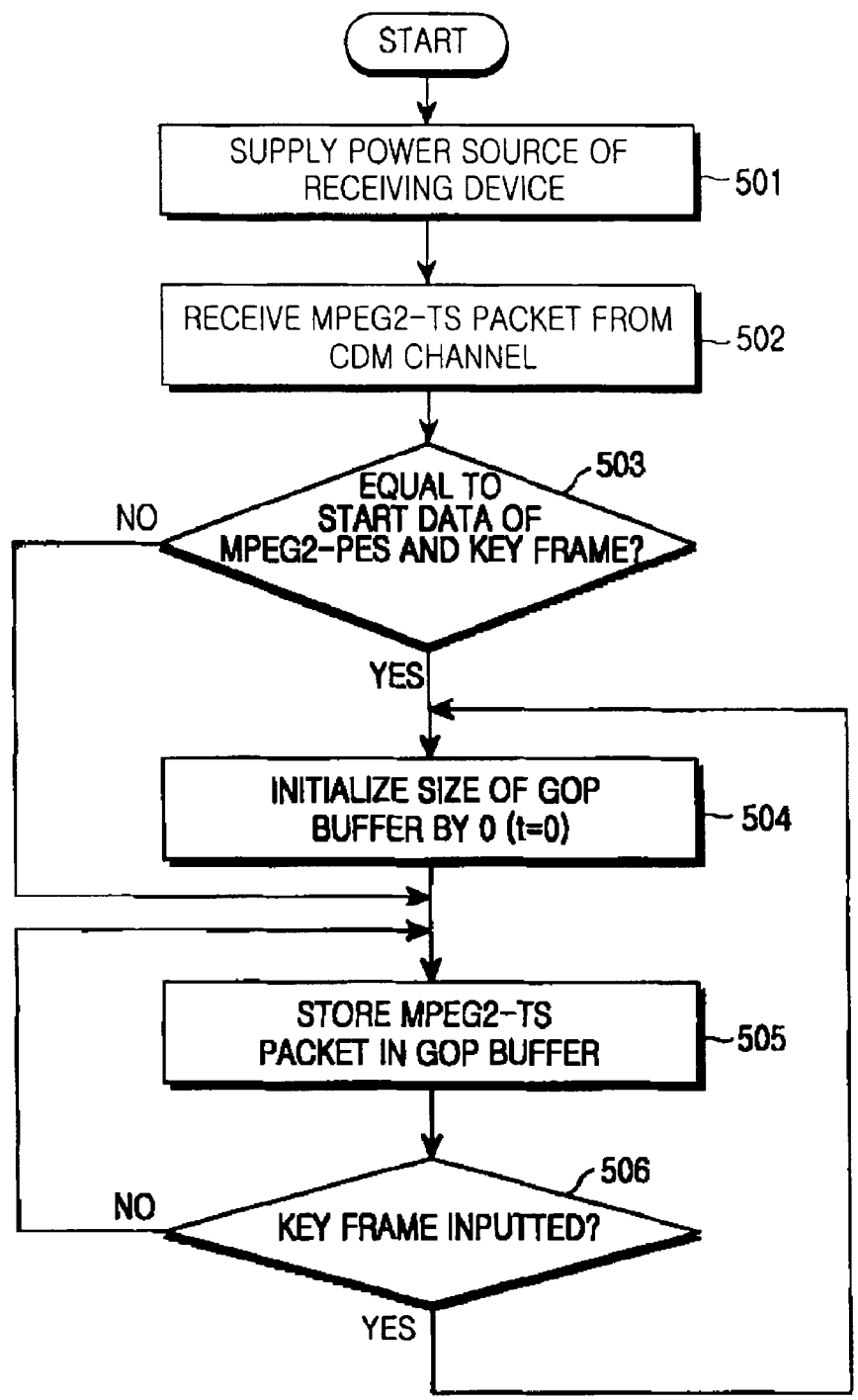
FIG. 5 is a flowchart illustrating a method for storing a MEPG2-TS packet received from a CDM channel, in a GOP buffer as a GOP unit according to an exemplary embodiment of the present invention.

FIG. 5 is a flowchart illustrating a method for storing the MEPG2-TS packet received from the CDM channel, in the GOP buffer as the GOP unit according to an exemplary embodiment of the present invention.

FIG. 5 represents an exemplary method for storing the MPEG2-TS packet of the channel, as the GOP unit in the GOP buffers 302-1 . . . 302-n, over which the user is not in the course of viewing using the DMB receiving device.

Referring to FIG. 5, upon the receipt of a power source of the DMB receiving device in response to an input by the user (Step 501), the GOP buffer 302-1 . . . 302-n receives the MPEG2-TS packet from the CDM channel 301-1 . . . 301-n (Step 502).

The MPEG2-TS packet inputted to the GOP buffer 302-1 . . . 302-n from the CDM channel 301-1 . . . 301-n includes the MPEG2-TS packet corresponding to the audio; the MPEG2-TS packet corresponding to the video, not the key frame; other MPEG2-TS packets, not the audio and the video; and the MPEG2-TS packet corresponding to the video key frame (or the IDR-frame).

The GOP buffer 302-1 . . . 302-n checks whether or not the received MPEG2-TS packet is equal to start data of the MPEG2-PES and corresponds to the key frame (Step 503). The checking determines whether or not the received MPEG2-TS packet is equal to the start data of the MPEG2-PES and corresponds to the key frame, includes a process of checking whether or not a MPEG2-TS header of the received MPEG2-TS packet indicates the start of the MPEG2-PES, a process of checking whether or not a value of a MPEG2-PES header indicates the video, and a process of checking a value of payload data of the MPEG2-PES. The process of checking the MPEG2-TS packet received from the CDM channel 301-1 . . . 301-n, and detecting the key frame will be in more detail described with reference to FIG. 6.

When it is determined that the received MPEG2-TS packet is equal to the start data of the MPEG2-PES and is equal to the key frame (Step 503), the GOP buffer 302-1 . . . 302-n initializes the "t" value denoting the size by "0" (Step 504). After that, the GOP buffer 302-1 . . . 302-n stores the MPEG2-TS packet received from the CDM channel 301-1 . . . 301-n (Step 505).

When it is determined that the received MPEG2-TS packet is not equal to the start data of the MPEG2-PES or is not equal to the key frame (Step 503), the GOP buffer 302-1 . . . 302-n stores the received MPEG2-TS packet (Step 505).

When it is determined that the received MPEG2-TS packet is the key frame (Step 506), the GOP buffer 302-1 . . . 302-n repeatedly performs the processes of initializing its size of "t" by "0", and storing the MPEG2-TS packet received from the CDM channel 301-1 . . . 301-n until it again receives the next key frame.

By the above process, the GOP buffer 302-1 . . . 302-n stores the MPEG2-TS packet of the channel, as the GOP unit, over which the user is not in the course of viewing using the DMB receiving device. The GOP buffer 302-1 . . . 302-n always stores the MPEG2-TS packet corresponding to the received key frame, at its start position.

Figure 6:
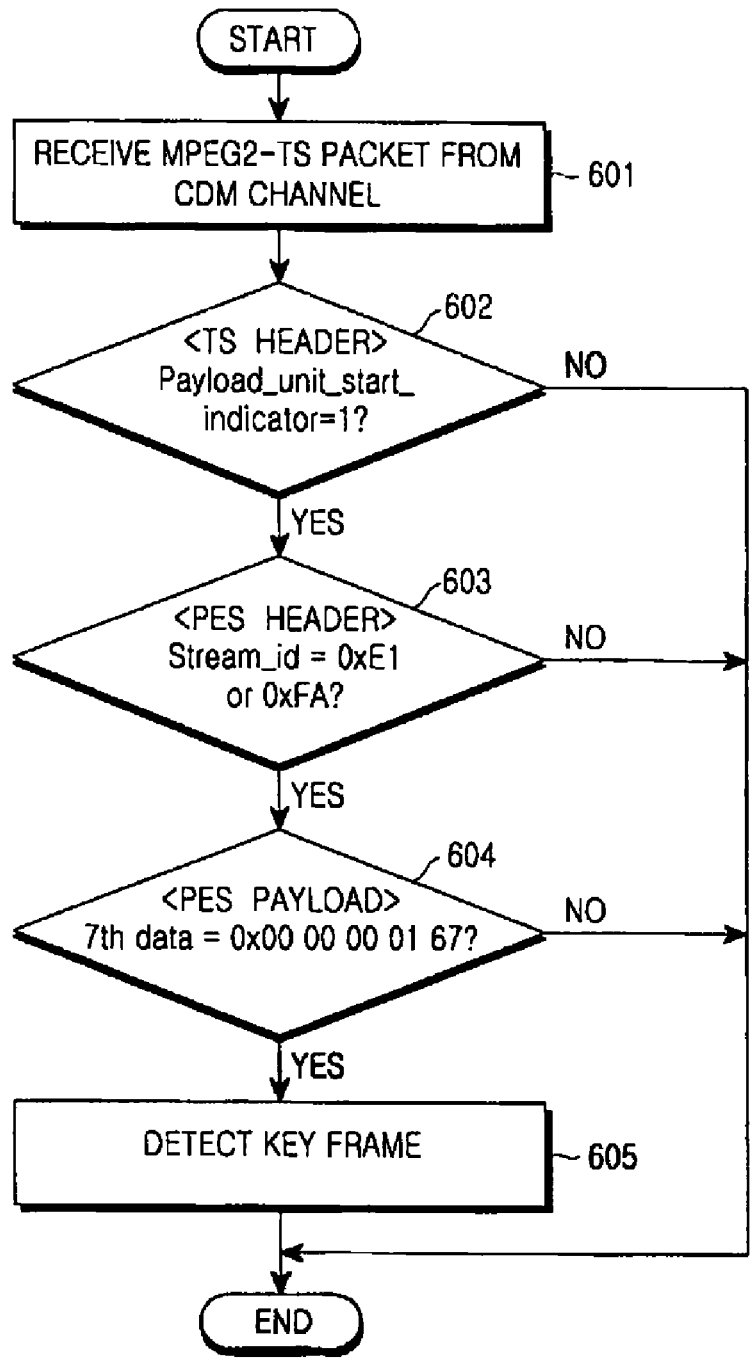
FIG. 6 is a flowchart illustrating a method for detecting a key frame while receiving a MPEG-2 TS packet from the CDM channel of FIG. 5.

FIG. 6 is a flowchart illustrating the method for detecting the key frame while receiving the MPEG-2 TS packet from the CDM channel of FIG. 5.

Referring to FIG. 6, upon the receipt of the MPEG2-TS packet from the GOP channel 301-1 . . . 301-n (Step 601), the GOP buffer 302-1 . . . 302-n checks whether or not a value of "payload_unit_start_indicator" indicating a start of the MPEG2-TS packet is equal to "1" (payload_unit_start_indicator=1) in the MPEG2-TS packet header of the received MPEG2-TS packet (Step 602).

When it is determined that the value of "payload_unit_start_indicator" is equal to "1", the GOP buffer 302-1 . . . 302-n checks whether or not a value of "stream_id" of the MPEG2-PES header is equal to "0xE1" or "0xFA," denoting the video (stream_id=0xE1 or 0xFA) (Step 603).

When it is determined that the value of "stream_id" of the MPEG2-PFS header is equal to the "0xE1" or "0xFA," denoting the video, the GOP buffer 302-1 . . . 302-n checks whether or not a $7^{th}$ data of 5 bytes among the payload data of the MPEG2-PES is equal to "0x00 00 00 01 67" (H.264 Sequence Parameter Set) ($7^{th}$ data=0x00 00 00 01 67) (Step 604).

If the received MPEG2-TS packet satisfies the Steps 602 to 604, the GOP buffer (302-1 . . . 302-n) regards the received MPEG2-TS packet as the MPEG2-TS packet including the key frame, and detects and checks the MPEG2-TS packet (Step 605).

By the above method, the GOP butters 302-1 . . . 302-n each allocate and store the MPEG2-TS packets of all the channels prepared by the satellite DMB service, as the GOP unit, respectively. If the user switches the channel of the satellite DMB service during an operation, the A/V data of the GOP buffer corresponding to the switched channel is transmitted to the A/V reproducing buffer 304.

The A/V reproducing buffer 304 can directly reproduce the MPEG2-TS packet corresponding to the key frame without the need to wait. This results in the shortening of the channel switching time.

The present invention has an effect of shortening the channel switching time of the DMB receiving device by minimizing the video key frame extraction delay of the codec delay during the delay time generated at the time of the channel switching of the DMB service.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data receiving device for shortening a channel switching time in a digital multimedia broadcasting (DMB) system, the device comprising:
  a plurality of code division multiplexing (CDM) channels, each for:
  receiving a broadcast signal from a DMB satellite,
  demodulating the broadcast signal, and
  generating a moving picture experts group2-transport stream (MPEG2-TS) packet;
  a plurality of group-of-picture (GOP) buffers, each associated with one of the CDM channels, and each for:
  receiving the MPEG2-TS packet from the associated CDM channel,
  checking whether the received MPEG2-TS packet includes a key frame, and, if so, initializing the GOP buffer to a size value of zero, and storing the received MPEG2-TS packet as a GOP unit until a next key frame is received, and wherein when the next key frame is received in the course of storing the MPEG2-TS packet in the GOP buffer, repeating the initializing and storing to again initialize the GOP buffer to a size value of zero and store the received MPEG2-TS packet until a next key frame is again received to the initialized GOP buffer;
  a channel switch for switching a channel of a DMB service to one of the GOP buffers corresponding to the switched DMB service channel in response to an input signal from a user;
  an A/V (audio/video) reproducing buffer for buffering a predetermined amount of A/V data to reproduce the A/V data of the one GOP buffer switched by the channel switch; and an A/V decoder for receiving the A/V data from the A/V reproducing buffer, and decoding the received A/V data.

2. The data receiving device of claim 1, wherein a number of CDM channels is greater than a number of broadcasting channel provided from the satellite DMB service.

3. The data receiving device of claim 1, wherein the GOP unit indicates a set of frames comprising: a specific key frame, an instantaneous decoder refresh (IDR)-frame and a frame before a next key frame is inputted.

4. The data receiving device of claim 1, wherein, when it is determined that the MPEG2-TS packet received is the key frame, the GOP buffer initializes a value of "t" denoting its buffering size by "0", and stores the MPEG2-TS packet until it receives a next key frame.

5. The data receiving device of claim 4, wherein each GOP buffer stores:
   a MPEG2-TS packet corresponding to audio data;
   a MPEG2-TS packet corresponding to video data that is not the key frame;
   other MPEG2-TS packets that are neither audio nor video data; and
   a MPEG2-TS packet corresponding to a video key frame or an IDR-frame.

6. The data receiving device of claim 4, wherein the receiving device simultaneously deinterleaves an N number of channels and has a memory size of at least N×64 Kbytes.

7. A method for shortening a channel switching time in a digital multimedia broadcasting (DMB) system, the method comprising steps of:
   receiving, by a DMB receiving device comprising a plurality of group-of-picture (GOP) buffers, a moving picture experts group2-transport stream (MPEG2-TS) packet from one of a plurality of code division multiplexing (CDM) channels;
   checking whether the received MPEG2-TS packet includes a key frame, and if so, initializing at the DMB receiving device a value of "t" denoting a buffering size of one of the plurality of GOP buffers to zero, and storing the received MPEG2-TS packet until a next key frame is inputted to the initialized GOP buffer, wherein, when the next key frame is inputted in the course of storing the MPEG2-TS packet in the GOP buffer, repeating the initializing and storing to again initialize the buffering size of "t" of the GOP buffer to zero and store the received MPEG2-TS packet until a next key frame is again inputted to the initialized GOP buffer, and wherein in response to a user initiated DMB channel switch operation, the stored MPEG2-TS packet is transferred from the GOP buffer to an audio/video (A/V) reproducing buffer for buffering a predetermined amount of A/V data to enable direct A/V reproduction of the MPEG2-TS packet.

8. The method of claim 7, wherein the step of checking whether the received MPEG2-TS packet includes the key frame comprises steps of:
   checking whether or not a value of "payload_unit_start_indicator", which indicates a start of the MPEG2-TS packet in a header of the MPEG2-TS packet received from the CDM channel, is equal to "1";
   checking whether or not a value of "stream_id" of a MPEG2-PES header is equal to "0xE1" or "0xFA" denoting a video when it is determined that the value of "payload_unit_start_indicator" is equal to "1";
   checking whether or not $7^{th}$ data of 5bytes among payload data of a MPEG2-PES is equal to "0x00 00 00 01 67" when it is determined that the value of "stream_id" of the MPEG2-PES header is equal to the "0xE1" or "0xFA" denoting the video; and
   determining the received MPEG2-TS packet as the key frame when the value of the payload_unit start_indicator is "1", the stream_id is 0xE1" or "0xFA" and the $7^{th}$ data of 5bytes is equal to "0x00 00 00 01 67."

9. An apparatus for shortening a channel switching time in a digital multimedia broadcasting (DMB) system, the apparatus comprises:
   a processor in communication with a memory, the processor executing code for:
   receiving, at a DMB receiving device comprising a plurality of group-of-picture (GOP) buffers, a moving picture experts group2-transport stream (MPEG2-TS) packet from one of a plurality of code division multiplexing (CDM) channels;
   checking whether the received MPEG2-TS packet includes a key frame and if so, initializing, at the DMB receiving device, a value of "t" denoting a buffering size of one of the plurality of GOP buffers to zero, and storing the received MPEG2-TS packet until a next key frame is inputted to the initialized GOP buffer, wherein, when the next key frame is inputted in the course of storing the MPEG2-TS packet in the GOP buffer, repeating the initializing and storing to again initialize the buffering size of "t" of the GOP buffer to zero and store the received MPEG2-TS packet until a next key frame is again inputted to the initialized GOP buffer, and wherein in response to a user initiated DMB channel switch operation, the stored MPEG2-TS packet is transferred from the GOP buffer to an audio/video (A/V) reproducing buffer for buffering a predetermined amount of A/V data to enable direct A/V reproduction of the MPEG2-TS packet.

10. The apparatus of claim 9, wherein the step of checking whether the received MPEG2-TS packet is the key frame comprises steps of:
   checking whether or not a value of "payload_unit_startindicator", which indicates a start of the MPEG2-TS packet in a header of the MPEG2-TS packet received from the CDM channel, is equal to "1";
   checking whether or not a value of "stream_id" of a MPEG2-PES header is equal to "0xE1" or "0xFA" denoting a video when it is determined that the value of "payload unit_start_indicator" is equal to "1";
   checking whether or not $7^{th}$ data of 5bytes among payload data of a MPEG2-PES is equal to "0x00 00 00 01 67" when it is determined that the value of "stream_id" of the MPEG2-PES header is equal to the "0xE1" or "0xFA" denoting the video; and
   determining the received MPEG2-TS packet as the key frame when the value of the payload_unit_start_indicator is "1", the stream_id is 0xE1" or "0xFA" and the $7^{th}$ data of 5bytes is equal to "0x00 00 00 01 67."

11. A non-transitory computer-readable storage medium comprising instructions that, when executed by a processor cause a data receiving device to shorten a channel switching time in a digital multimedia broadcasting (DMB) system, the storage medium providing instruction to the processor for executing the steps of:
   receiving, at a DMB receiving device comprising a plurality of group-of-picture (GOP) buffers, a moving picture experts group2-transport stream (MPEG2-TS) packet from one of a plurality of code division multiplexing (CDM) channels;

checking whether the received MPEG2-TS packet includes a key frame, and if so, initializing, at the DMB receiving device, a value of "t" denoting a buffering size of one of the plurality of GOP buffers to zero, and storing the received MPEG2-TS packet until a next key frame is inputted to the initialized GOP buffer, wherein, when the next key frame is inputted in the course of storing the MPEG2-TS packet in the GOP buffer, repeating the initializing and storing to again initialize the buffering size of "t" of the GOP buffer to zero and store the received MPEG2-TS packet until a next key frame is again inputted to the initialized GOP buffer, and wherein in response to a user initiated DMB channel switch operation, the stored MPEG2-TS packet is transferred from the GOP buffer to an audio/video (A/V) reproducing buffer for buffering a predetermined amount of A/V data to enable direct A/V reproduction of the MPEG2-TS packet.

12. The storage medium of claim 11, wherein the step of checking whether the received MPEG2-TS packet is the key frame comprises steps of:

checking whether or not a value of "payload_unit_start_indicator", which indicates a start of the MPEG2-TS packet in a header of the MPEG2-TS packet received from the CDM channel, is equal to "1";

checking whether or not a value of "stream_id" of a MPEG2-PES header is equal to "0xE1" or "0xFA" denoting a video when it is determined that the value of "payload unit start indicator" is equal to "1";

checking whether or not $7^{th}$ data of 5bytes among payload data of a MPEG2-PES is equal to "0x00 00 00 01 67" when it is determined that the value of "stream_id" of the MPEG2-PES header is equal to the "0xE1" or "0xFA" denoting the video; and determining the received MPEG2-TS packet as the key frame when the value of the payload_unit_start_indicator is "1", the stream_id is 0xE1" or "0xFA" and the $7^{th}$ data of 5bytes is equal to "0x00 00 00 01 67."

* * * * *